(12) United States Patent
Rotella

(10) Patent No.: US 7,494,218 B1
(45) Date of Patent: Feb. 24, 2009

(54) ADJUSTABLE SPECTACLE KIT

(76) Inventor: John R. Rotella, 209 Liberty St., Bridgeville, PA (US) 15017

( * ) Notice: Subject to any disclaimer, the term of this patent is extended or adjusted under 35 U.S.C. 154(b) by 0 days.

(21) Appl. No.: 12/004,269

(22) Filed: Dec. 20, 2007

Related U.S. Application Data

(60) Provisional application No. 60/919,682, filed on Mar. 23, 2007.

(51) Int. Cl.
*G02C 1/00* (2006.01)
(52) U.S. Cl. .............................. 351/158; 2/13
(58) Field of Classification Search ................. 351/41, 351/47, 57, 158; 2/9, 13, 205; 128/863, 128/25
See application file for complete search history.

(56) References Cited

U.S. PATENT DOCUMENTS

| | | | |
|---|---|---|---|
| 3,051,957 A | 9/1962 | Chan | 2/14 |
| 3,787,113 A | 1/1974 | Shedrow | 351/43 |
| 4,349,251 A | 9/1982 | Shedrow | 351/128 |
| 4,542,965 A | 9/1985 | Shedrow | 351/57 |
| 4,618,225 A | 10/1986 | Shedrow | 351/57 |
| 4,711,539 A | 12/1987 | Krusas et al. | 351/63 |
| 4,810,080 A | 3/1989 | Grendol et al. | 351/41 |
| 5,170,502 A | 12/1992 | Hegendorfer et al. | 2/13 |
| 5,247,706 A | 9/1993 | Mark | 2/9 |
| 5,657,106 A * | 8/1997 | Herald et al. | 351/57 |
| 5,956,119 A | 9/1999 | Gibbs | 351/158 |
| 6,019,468 A | 2/2000 | Altemare | 351/158 |
| 6,591,459 B2 | 7/2003 | Muller et al. | 24/3.3 |

* cited by examiner

*Primary Examiner*—Hung X Dang
(74) *Attorney, Agent, or Firm*—Douglas Gene Glantz

(57) ABSTRACT

Adjustable spectacles article and protection method include a novel adjustable spectacle kit positioned in the interior surface of a self contained breathing mask. In one aspect, the breathing mask covers a full face of a wearer and includes a face plate permitting a wearer to view a space outside the mask. The adjustable spectacle kit includes a bracket attached to the interior surface of the mask, a lug attached to the bracket, and spectacles connected with the lug. In one aspect, the bracket defines a slot for holding the lug. In one aspect, the slot is elongated in an anteroposterior direction. In one aspect, a resilient elastomeric grommet is inserted in the slot, and the grommet frictionally engages the lug.

17 Claims, 25 Drawing Sheets

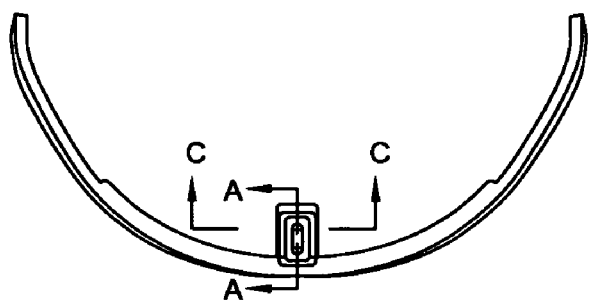
Fig. 8A
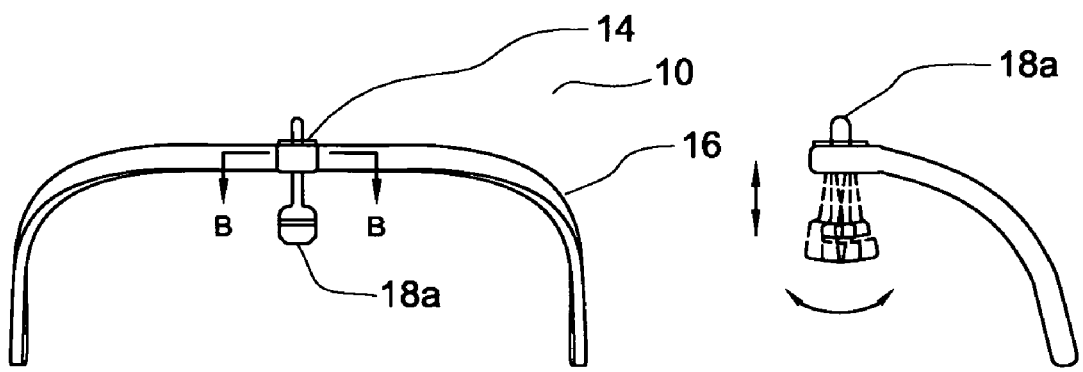
Fig. 8B
Fig. 8C
Fig. 8

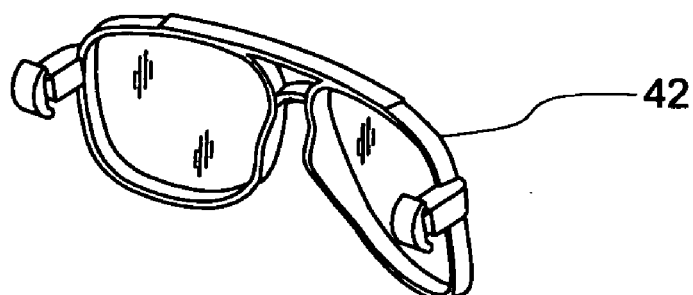
Fig. 12A
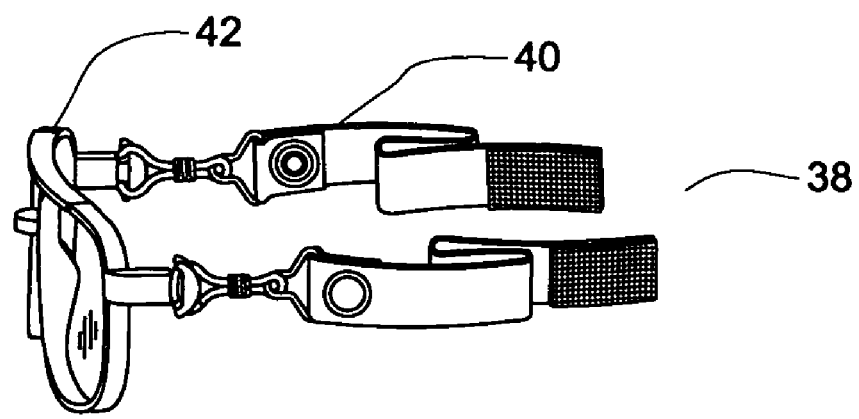
Fig. 12B
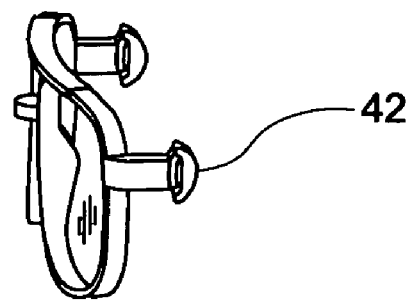
Fig. 12C
Fig. 12

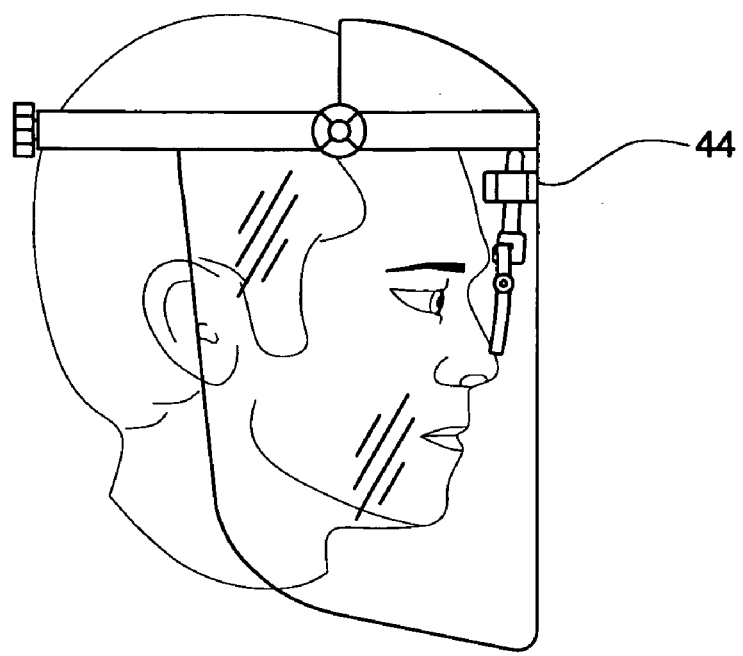
Fig. 20A
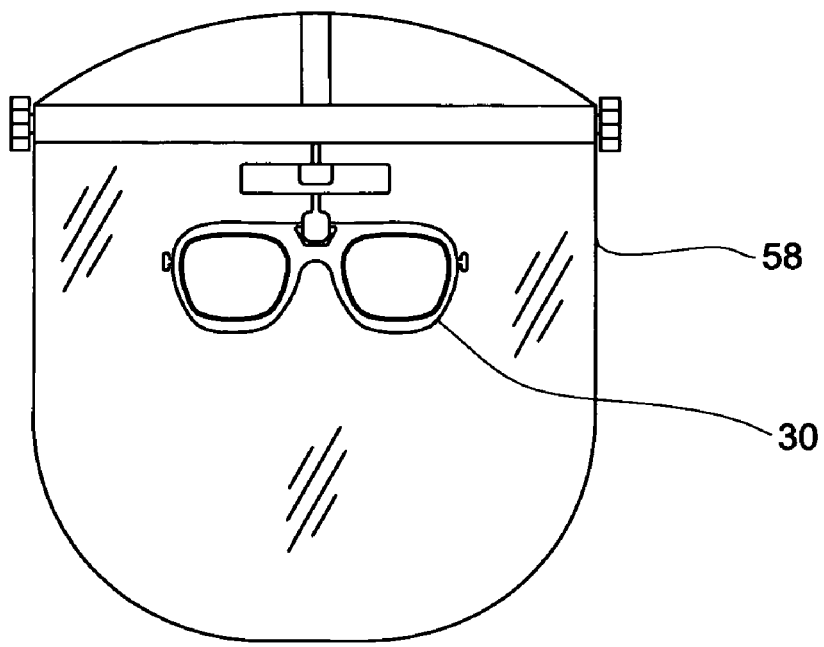
Fig. 20B
Fig. 20

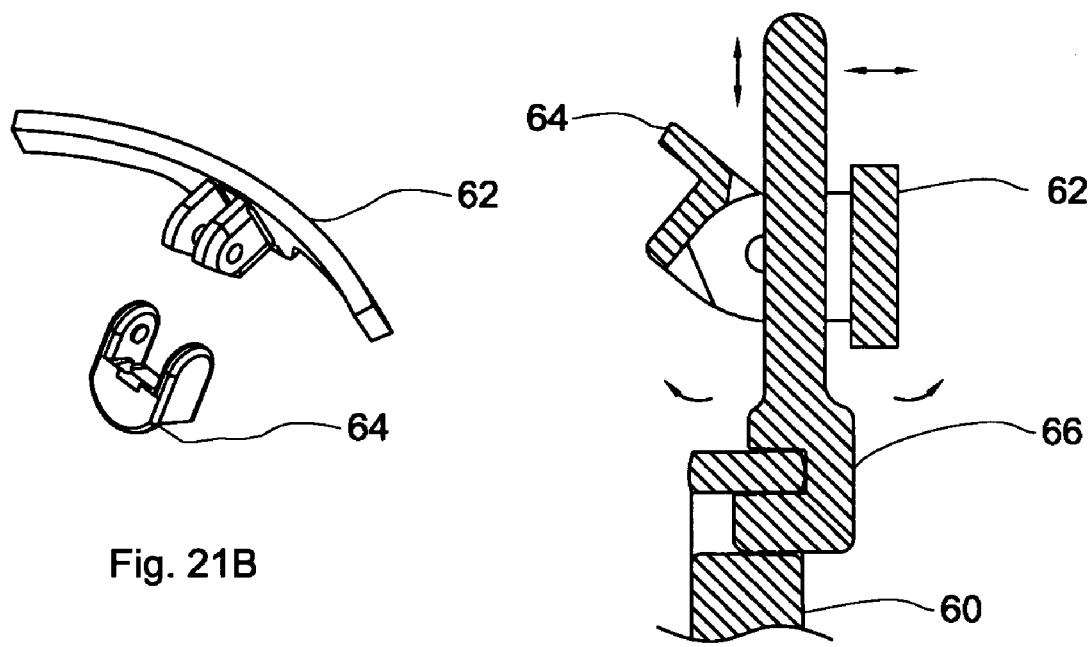
Fig. 21B
Fig. 21C
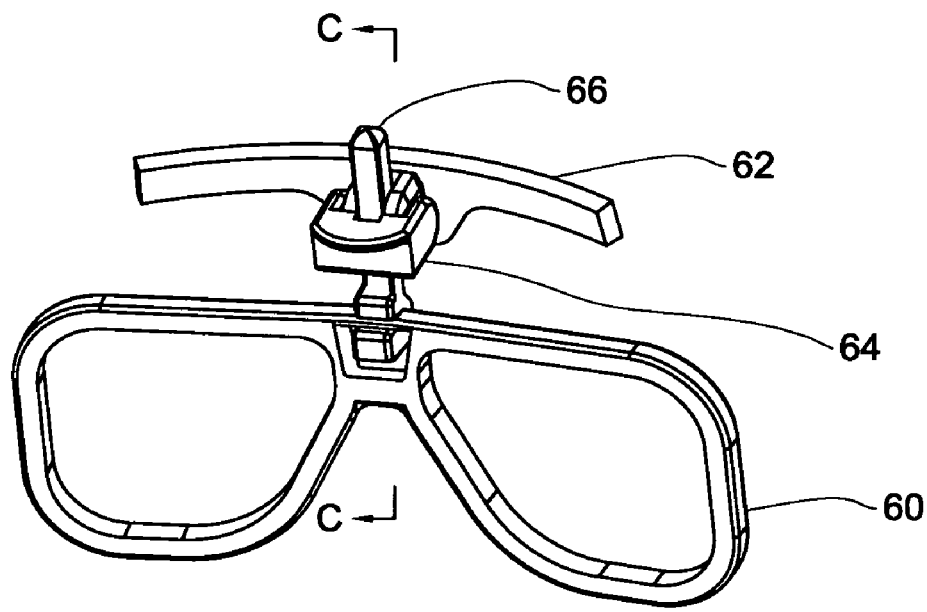
Fig. 21A
Fig. 21

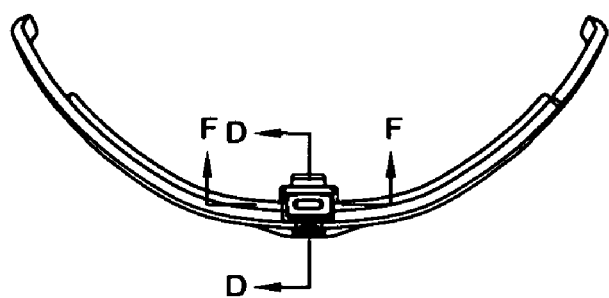
Fig. 26A
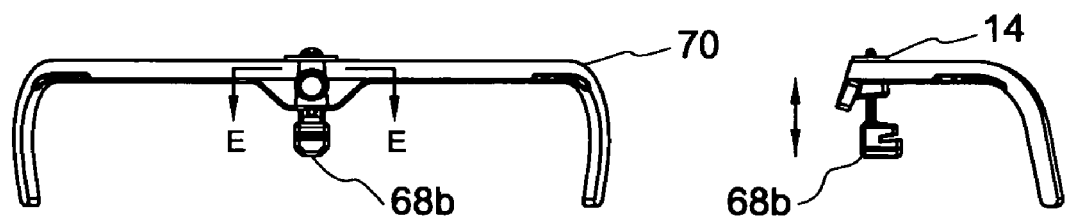
Fig. 26B
Fig. 26C
Fig. 26

SECTION D-D

SECTION E-E

SECTION F-F

ADJUSTABLE SPECTACLE KIT

This application is a Continuation-In-Part of U.S. Patent Application Ser. No. 60/919,682, filed Mar. 23, 2007, which is hereby incorporated by reference.

BACKGROUND OF THE INVENTION

1. Technical Field

This invention relates to spectacle kits for use with protective masks. In one aspect, this invention relates to spectacle kits apparatus and method of providing spectacle kits using the spectacle kits apparatus. In one aspect, this invention relates to a method of making and manufacturing spectacle kits. In one aspect, the invention relates to a kit for adjusting the position of spectacles placed inside protective masks that are used in hostile environments.

2. Background

Firemen, safety and rescue personnel, and industrial professionals often require protective masks or Self Contained Breathing Apparatus ("SCBA"). The protective masks enable personnel to enter hazardous environments, such as areas filled with caustic gases or burning structures. Protective masks also are needed as a safety precaution when entering potentially hazardous environments.

Some sports also require protective masks. For example, a protective mask is needed for underwater diving.

Persons requiring corrective optical lenses for improving visual acuity under normal conditions need corrective lenses while using protective masks. Using contact lenses under a protective mask is impractical because most soft contact lenses are made with materials incorporating substantial water content. The soft contact lenses become contaminated by smoke and/or chemicals, thereby making the lenses uncomfortable to wear or structurally damaging them.

Those who must wear protective masks and also require corrective optical lenses may obtain a spectacle kit. Spectacle kits include optical lenses supported on the nose or face by a frame and they typically include thermal plastic lenses, e.g. CR39 monomer polycarbonate corrective lenses, to improve the wearer's vision.

One example of a spectacle kit suitable for use with SCBA is shown in Altemare, Jr. U.S. Pat. No. 6,019,468 for "Spectacle Kit," the disclosure of which is hereby incorporated by reference, and included herein as in set forth in its entirety, to the extent consistent with the present invention.

INTRODUCTION TO THE INVENTION

Spectacle kits developed in the prior art generally retain corrective optical lenses in a fixed position, or they include structurally complicated mechanisms. Structurally complicated mechanisms are difficult to install and to operate, sometimes requiring special tools for adjusting their position. Accordingly, there still remains a need for the improved adjustable spectacle kit of the present invention.

Some objectives of the present invention are to provide a spectacle kit for adjusting the position of spectacles while they are installed in a protective mask; simplicity of operation; having few parts in the kit; not requiring separate tools to adjust the spectacles; and adaptability to a wide variety of commercially available SCBA.

An object and advantage of the adjustable spectacle kit of the present invention is that it allows for positional adjustment of spectacles while they are installed in a protective mask.

Another object and advantage of the present invention is that spectacles are easily attached to the kit and easy to adjust the position of the eyewear frame.

A further object and advantage of the adjustable spectacle kit of the present invention is that it is easy to install so that a user can quickly position eyewear into a protective mask properly and put on the mask within a minimum allotted time.

An additional object and advantage of the present invention is that commercially available eyewear attached to the adjustable spectacle kit can be removed for use outside of the protective mask. This convenience is important for wearers requiring prescription lenses or tinted lenses.

Additional objectives and advantages of the present invention will become readily apparent to persons skilled in the art from the following detailed description of some preferred embodiments and the illustrations of the figures of the drawings which follow.

SUMMARY OF THE INVENTION

The apparatus and method of the present invention provide a combination of a self contained breathing mask with an adjustable spectacle kit. The breathing mask covers a full face of a wearer and includes a face plate permitting a wearer to view a space outside the mask. The mask has an exterior surface and an interior surface.

The adjustable spectacle kit includes a bracket attached to the interior surface of the mask, a lug attached to the bracket, and spectacles connected with the lug. The bracket preferably defines a slot for holding the lug. The slot preferably is elongated in an anteroposterior direction. In a preferred embodiment, a resilient grommet comprising an elastomer is inserted in the slot. The grommet frictionally engages the lug.

In one embodiment, the slot has opposed lateral walls extending convexly into the slot. Here, the slot has anterior and posterior ends wider than a central portion between the anterior and posterior ends.

The lug includes an upper portion above the bracket and a lower portion below the bracket. The lower portion of the lug includes a frame holder for connecting the lug with a frame of the spectacles. The lug is made from a polymeric material, preferably a polycarbonate.

The spectacles include a frame for supporting at least one eyeglass lens and a bridge. The frame holder connects the lug with the frame for positionally adjusting the frame within the mask.

BRIEF DESCRIPTION OF THE DRAWINGS

FIG. 8A shows a top elevational view of an assembled adjustable spectacle kit.

FIG. 8B shows a front elevational view of the assembled kit of FIG. 8A.

FIG. 8C shows a side elevational view of the assembled kit of FIG. 8A.

FIG. 12A shows a fragmentary rear perspective view of a commercially available spectacles suitable for use with an adjustable spectacle kit of the invention.

FIG. 12B shows a side perspective view of the spectacles of FIG. 12A.

FIG. 12C shows a fragmentary side perspective view of the spectacles of FIG. 12A.

FIG. 20A shows a side perspective view of a protective mask installed with an adjustable spectacle kit.

FIG. 20B shows a front perspective view of the protective mask of FIG. 20A.

FIG. 21A shows a rear perspective view of an alternative embodiment of the adjustable spectacle kit.

FIG. 21B shows an exploded perspective view of the kit of FIG. 21A.

FIG. 21C shows a side cross-sectional view taken along the lines C-C of FIG. 21A.

FIG. 26A shows a top elevation view of an assembled adjustable spectacle kit.

FIG. 26B shows a front elevational view of the assembled kit of FIG. 26A.

FIG. 26C shows a side elevation view of the assembled kit of FIG. 26A.

DETAILED DESCRIPTION

The present invention includes novel apparatus and novel method for providing and using spectacle kits for use in protective safety masks. In one aspect, the present invention includes novel spectacle kits apparatus and method of providing a kit for adjusting the position of spectacles placed inside protective masks that are used in hostile environments. In one aspect, the present invention includes a method of making and manufacturing novel spectacle kits.

FIGS. 1-5 illustrate various protective safety masks with an adjustable spectacle kit of the invention in place.

Figure 1:
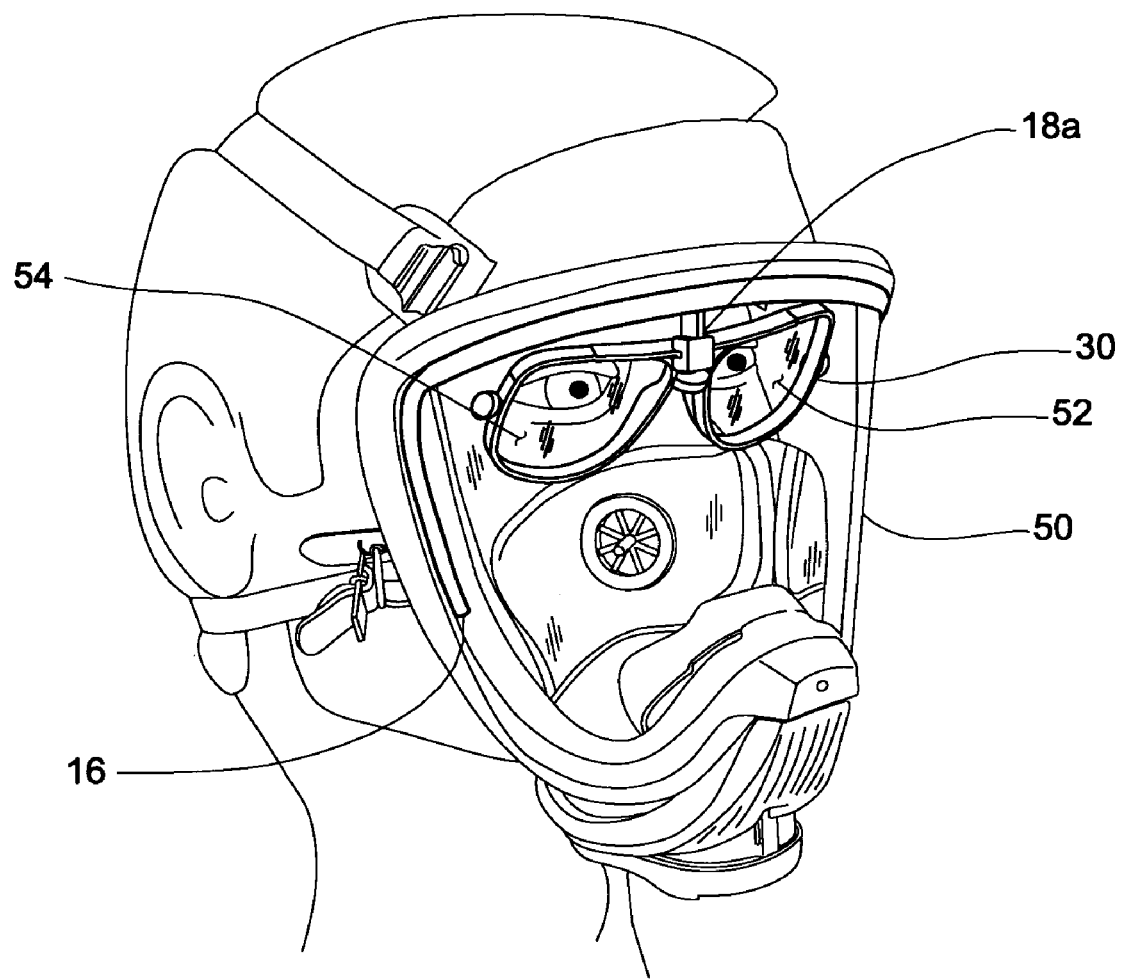
FIG. 1 shows a front perspective view of a safety mask with an adjustable spectacle kit of the invention in place.
Figure 2:
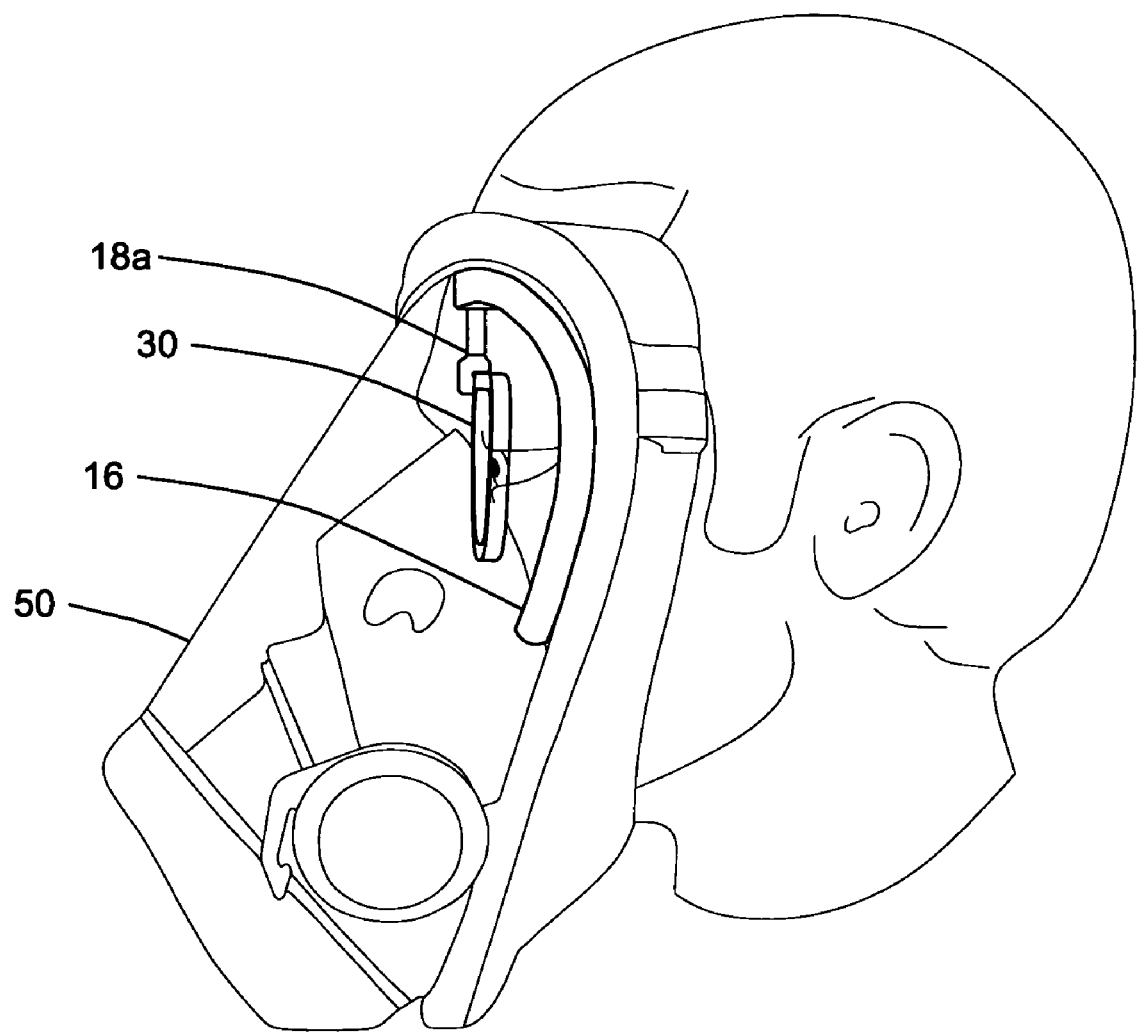
FIG. 2 shows a side perspective view of the mask and spectacle kit of FIG. 1.
Figure 3:
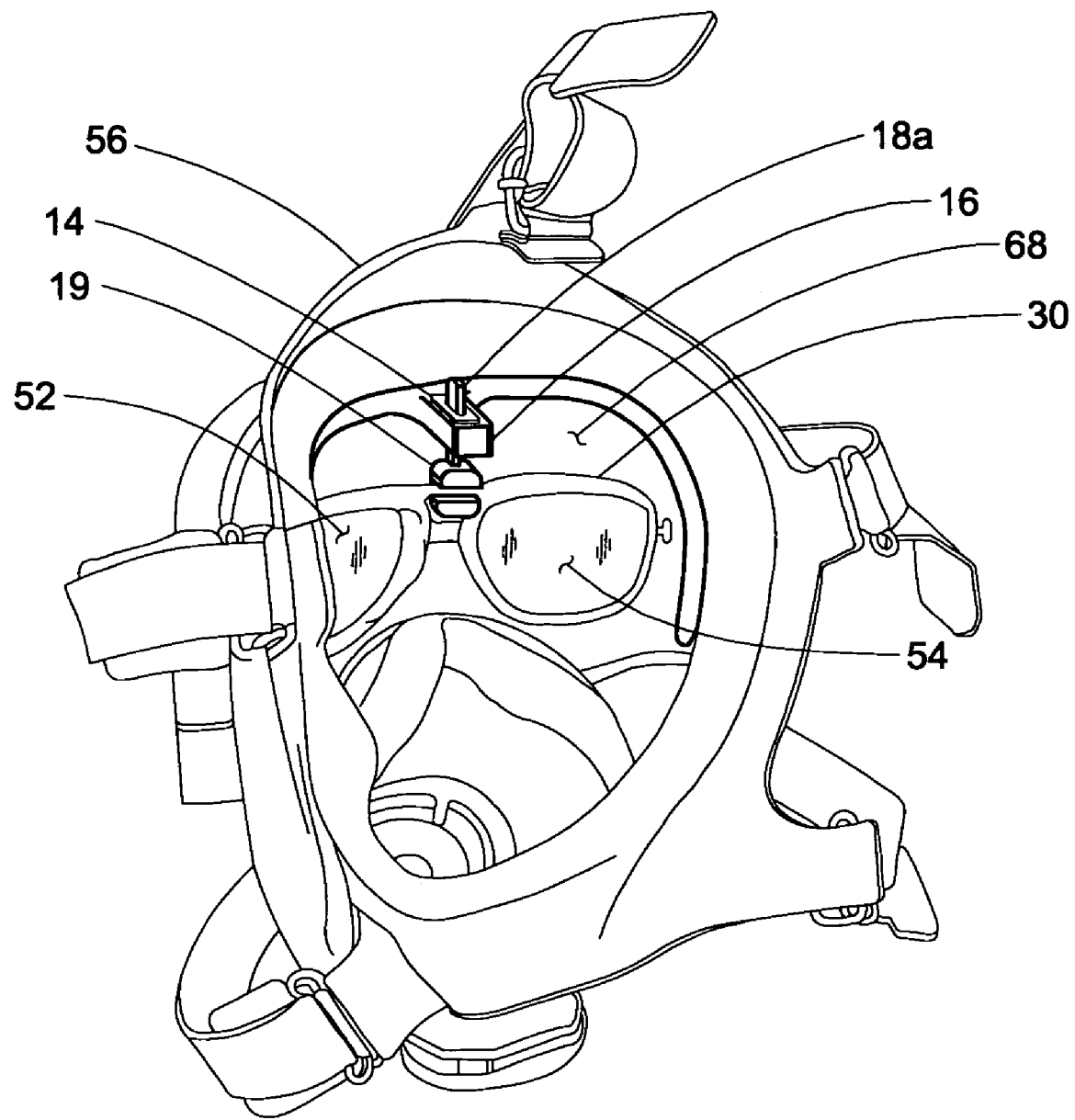
FIG. 3 shows a rear perspective view of a safety mask with an adjustable spectacle kit in place.

FIGS. 1-3 show an MSA Elite mask 50 fitted with an adjustable spectacle kit. The kit includes an insert 16 defining a slot holding a grommet 14 engaged with an adjustable lug 18a. The lug 18a holds large frame eyewear or spectacles 30 having lenses 52.

FIG. 3 is a rear perspective view of a Draeger mask 56 with a small full face plate 68. The mask 56 is fitted with an insert formed integrally with a bracket 16 with a slot containing a grommet holding an adjustable lug 18a. The lug includes a clip 19 for attaching eyewear frame 30.

Figure 4:
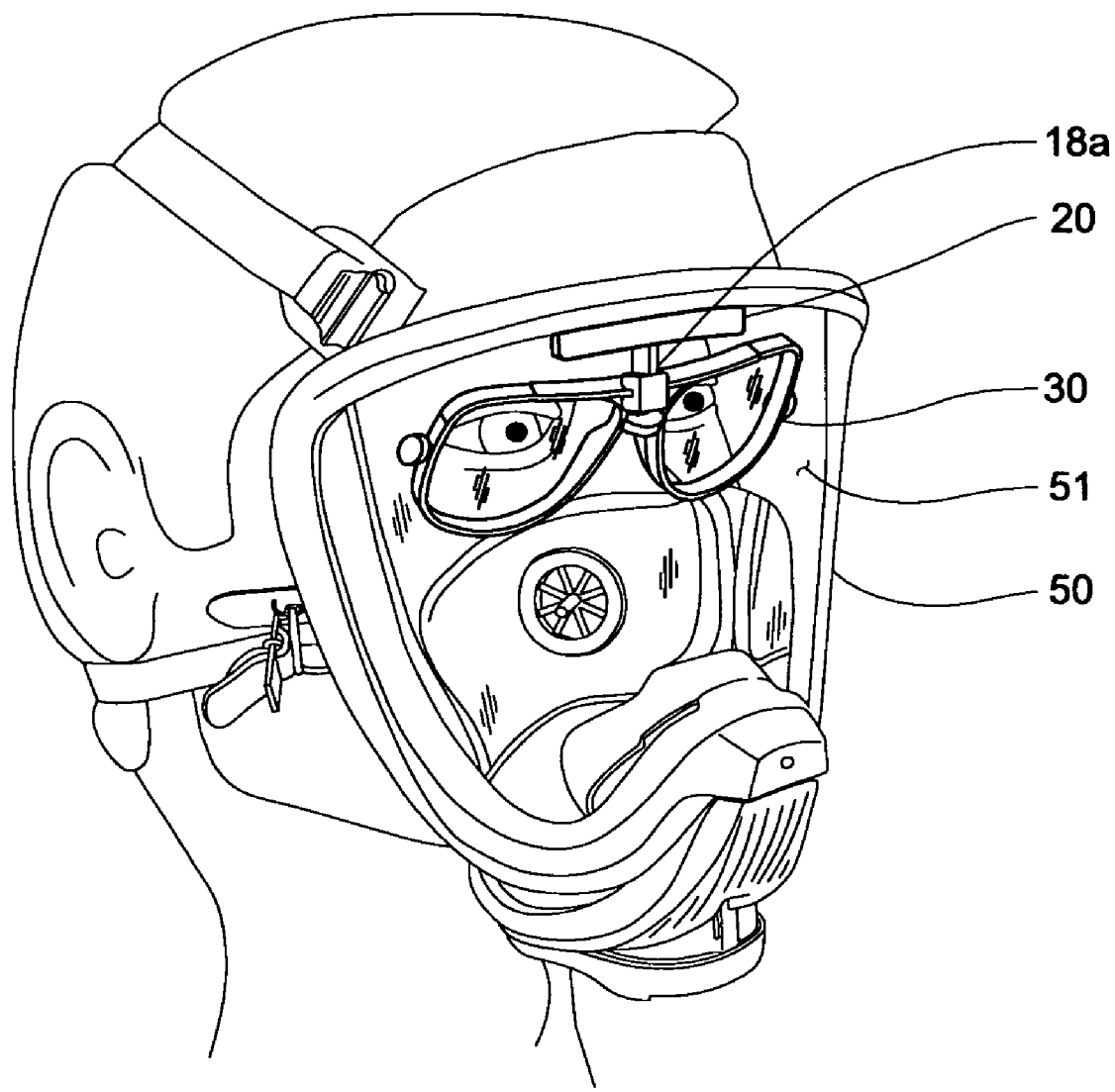
FIG. 4 shows a front perspective view of a safety mask including an adjustable spectacle kit.
Figure 5:
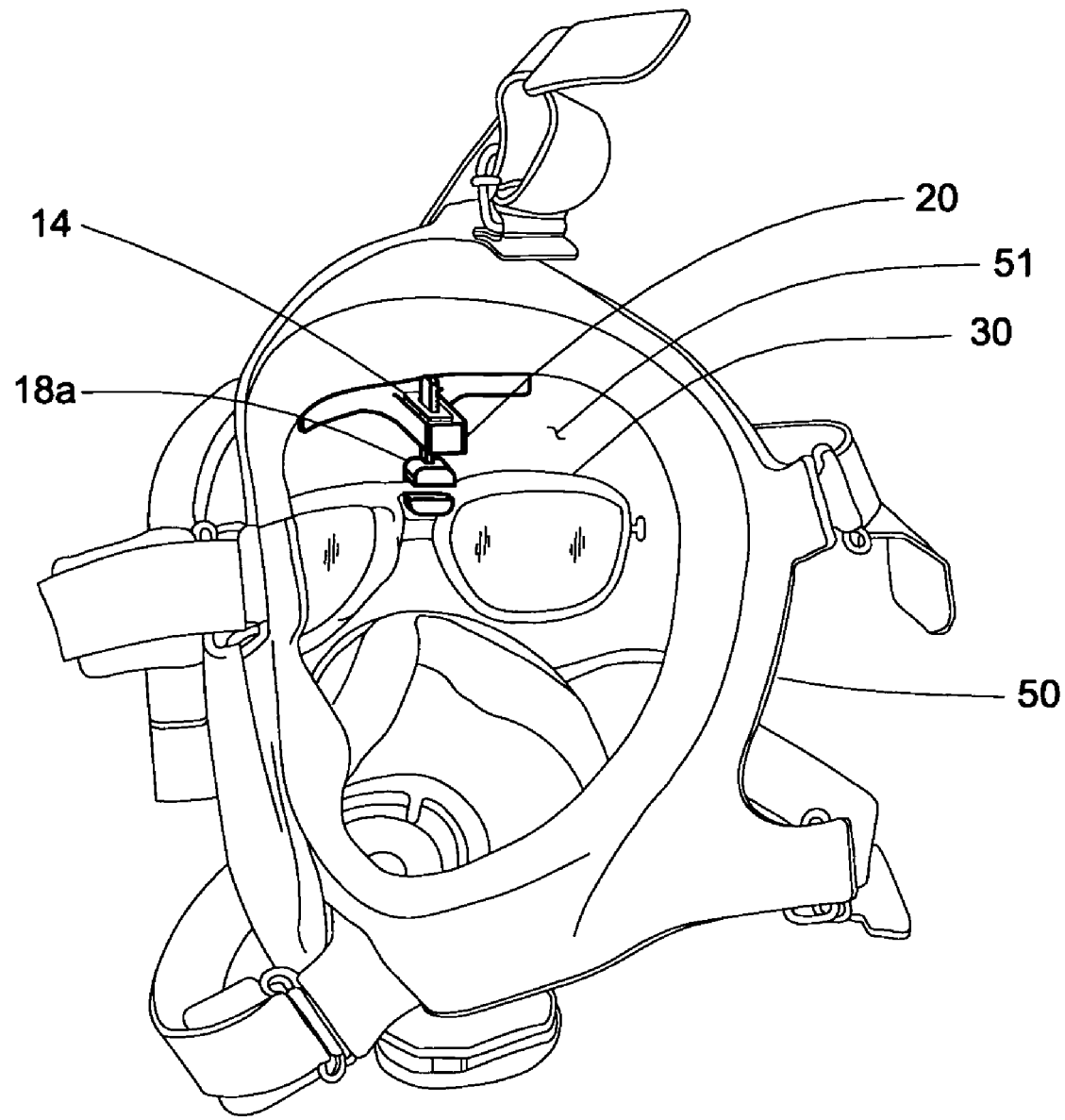
FIG. 5 shows a rear perspective view of the mask of FIG. 4.

FIGS. 4 and 5 include an MSA Elite mask 50 having a permanent bracket 20 cemented in place on an interior surface 51 of the mask. The bracket 20 supports an adjustable spectacle kit including a downwardly extending lug 18a attached to a frame 30 for eyeglass lenses.

Figure 6:
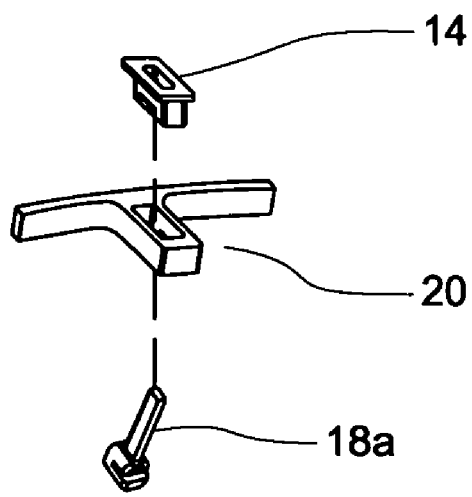
FIG. 6 shows an exploded perspective view of an adjustable spectacle kit.
Figure 7:
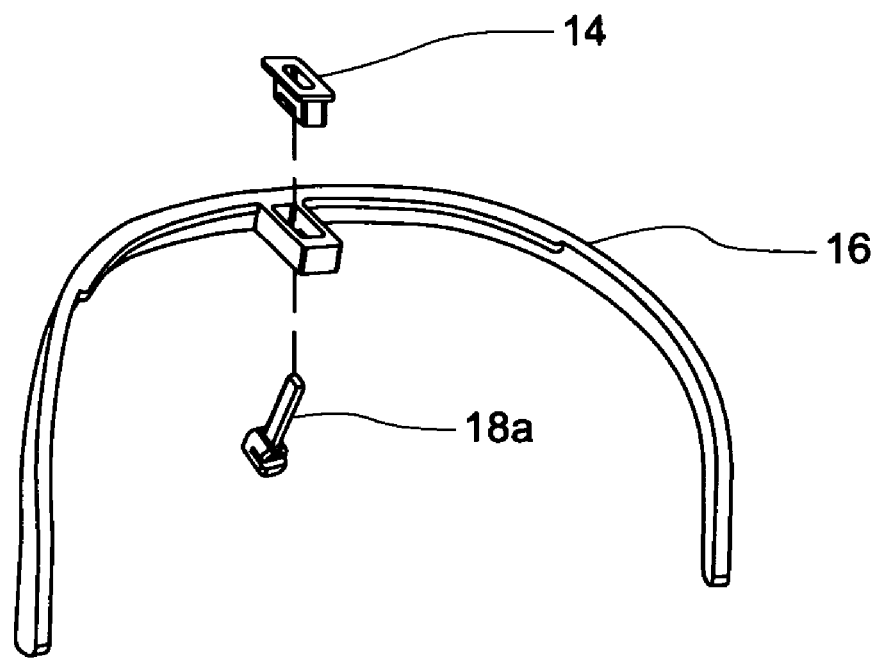
FIG. 7 shows an exploded perspective view of an adjustable spectacle kit.

FIGS. 6-8 are detailed views of an adjustable spectacle kit of the invention.

The embodiment shown in FIG. 6 includes a bracket 20; a grommet 14; and a lug 18a. The bracket 20 and lug 18 a are both polycarbonate moldings. The grommet 14 is a molded Neoprene™ elastomer. The lug 18a extends through elongated openings defined by the bracket 20 and grommet 14. The bracket 20 is permanently adhered to an interior surface of a mask, as shown in FIGS. 4 and 5.

In FIGS. 7 and 8, the adjustable kit 10 includes an insert 16 which is formed integrally of a polycarbonate material for removable attachment to a mask interior surface, for example as shown in FIG. 3.

Figure 9:
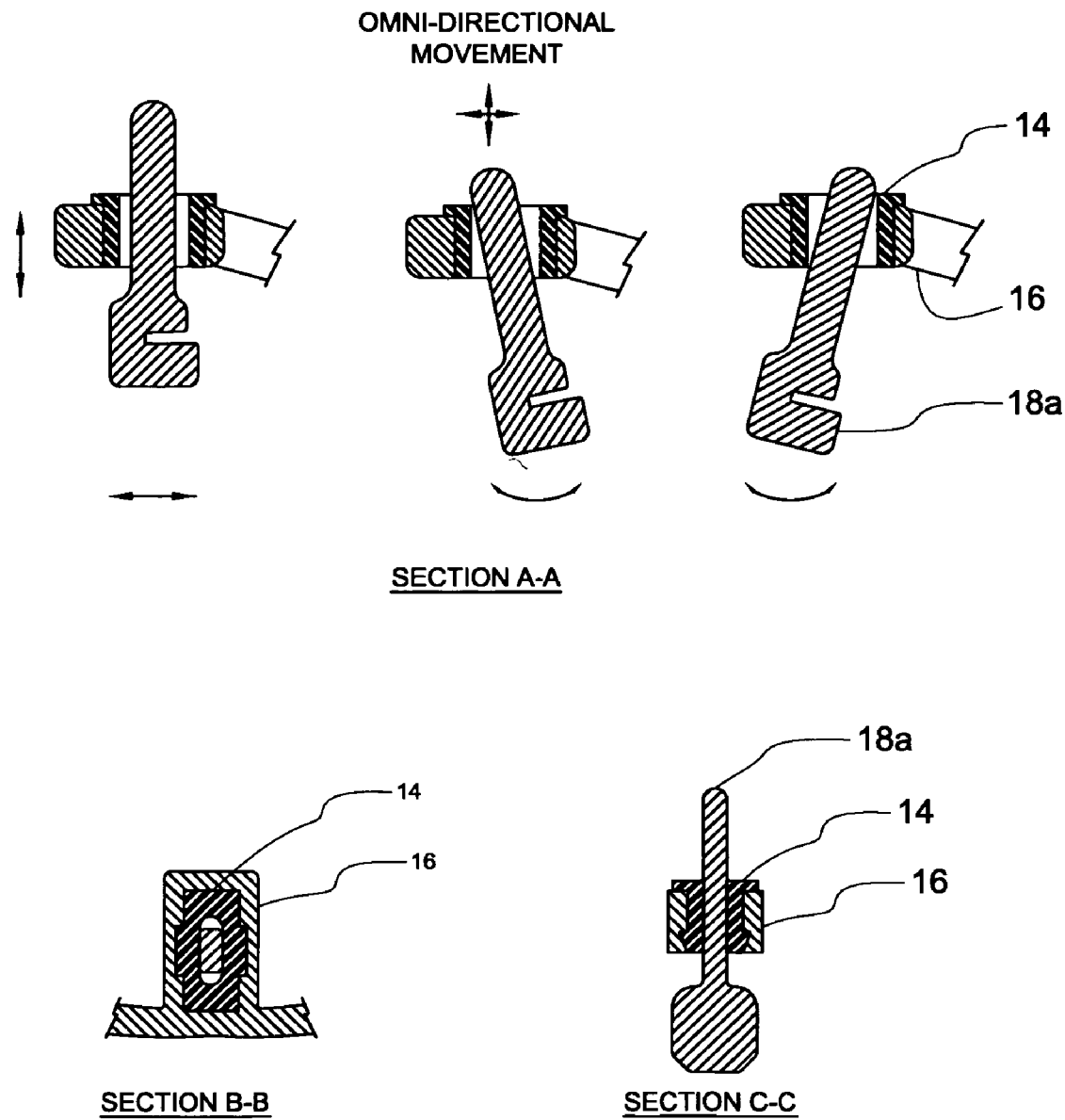
FIG. 9 shows several fragmentary cross-sectional views of an adjustable spectacle kit.

FIG. 9 includes several schematic views showing how the lug 18a is adjusted angularly while held by a grommet 14 inserted in the insert 16.

Figure 10:
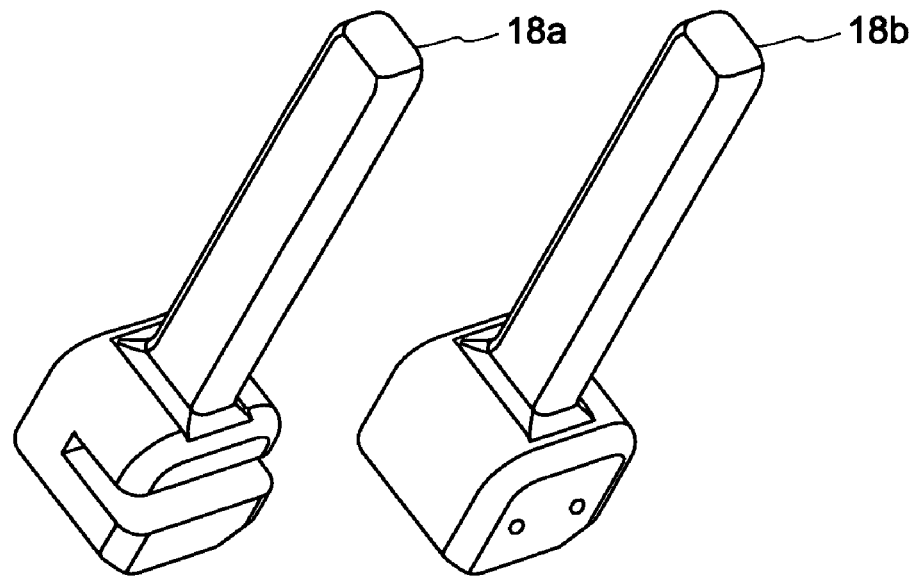
FIG. 10 shows several different embodiments of a lug for an adjustable spectacle kit.
Figure 10:
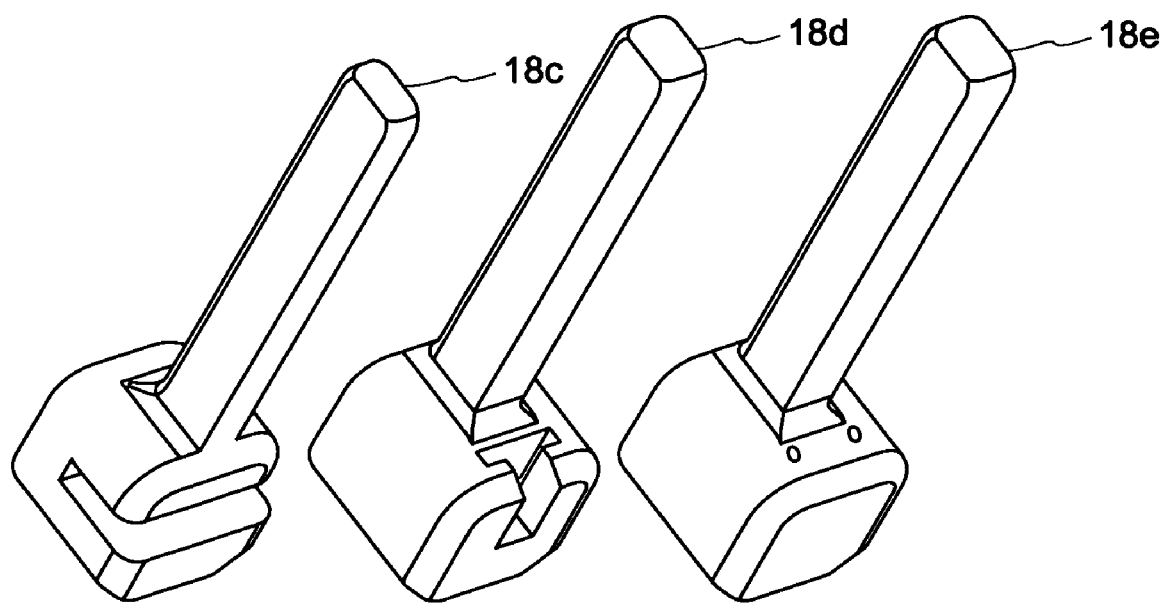

FIG. 10 shows five (5) different embodiments of the lug of the adjustable spectacle kit. Each lug 18a, 18b, 18c, 18d, 18e is distinctively sized and shaped for quick attachment to and detachment from a commercially available spectacle frame, for example the frames 30 shown in FIG. 11.

Figure 11:
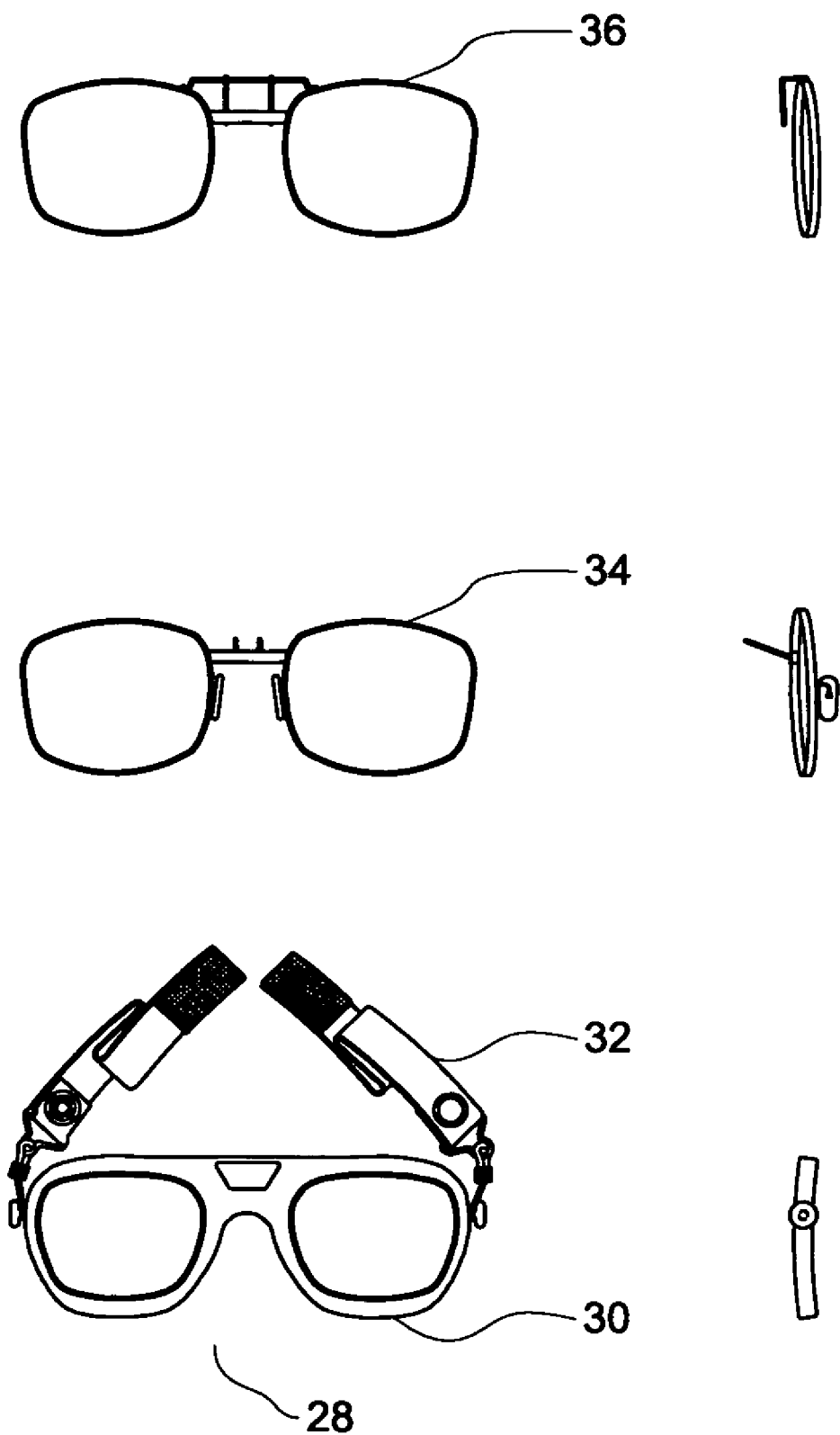
FIG. 11 shows three (3) spectacle frames suitable for use with an adjustable spectacle kit of the invention.

FIG. 11 includes front and side views of some commercially available eyewear, including an ALTEK® frame 28 (bottom), an MSA frame 34 (middle), and a TRISPEC frame 36 (top).

FIG. 12 shows in greater detail the ALTEK® eyewear 38 apart from the spectacle kit of the invention. The ALTEK® eyewear 38 includes a frame 42 and fastening straps 40 attached to opposite ends of the frame 42. The fastening straps 40 include Velcro™ strips. The Velcro™ strips may be connected to form a ring, enabling the ALTEK® eyewear 38 to be worn outside of a protective mask.

Figure 13:
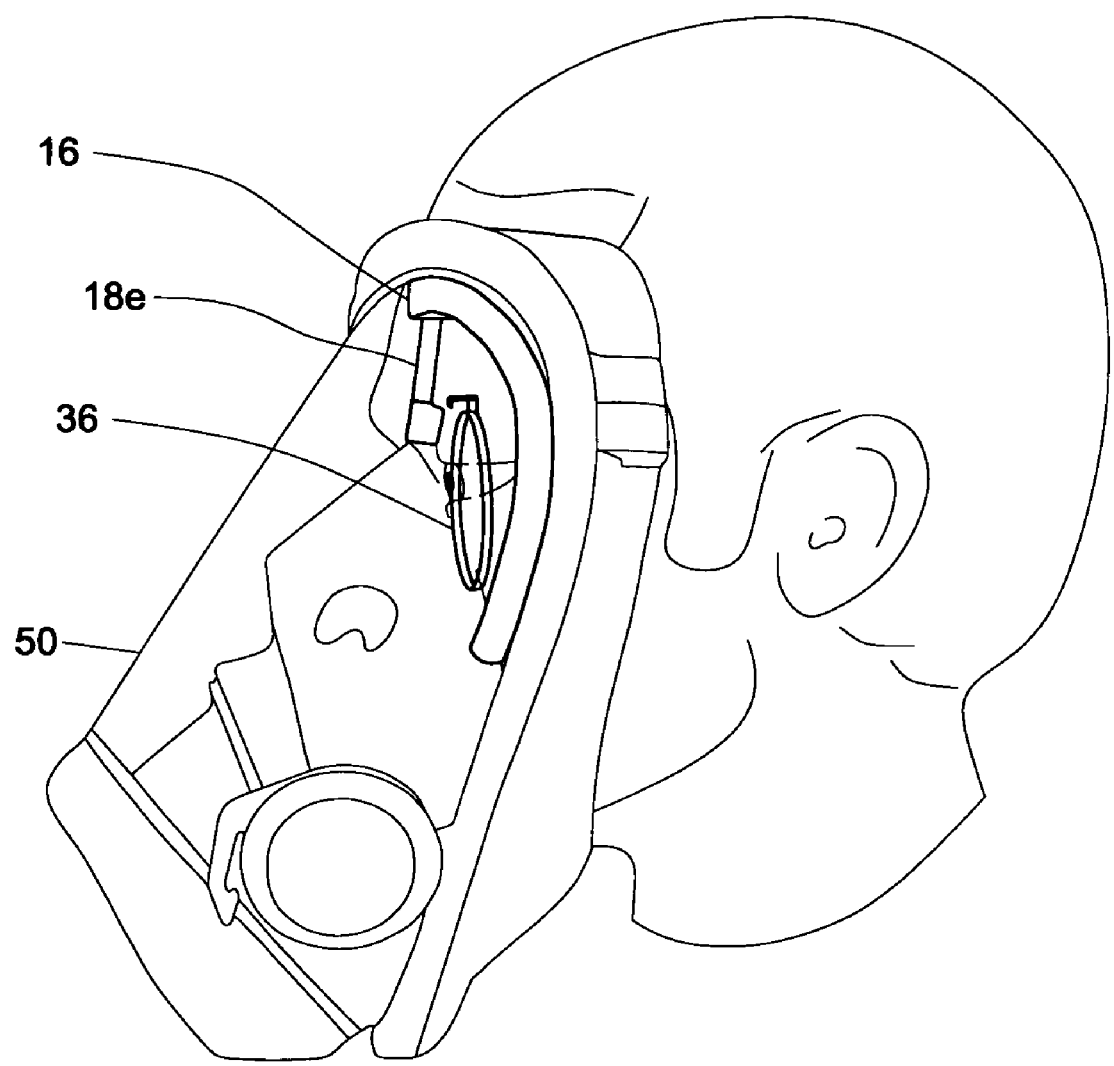
FIG. 13 shows a side perspective view of a protective mask having a frame attached to an adjustable spectacle kit.

FIG. 13 is a side view of a mask 50 fitted with the TRISPEC eyewear 36 of FIG. 11. A removable insert 16 inside the mask 50 supports an adjustable lug 18e attached to a frame of the eyewear 36.

Figure 14:
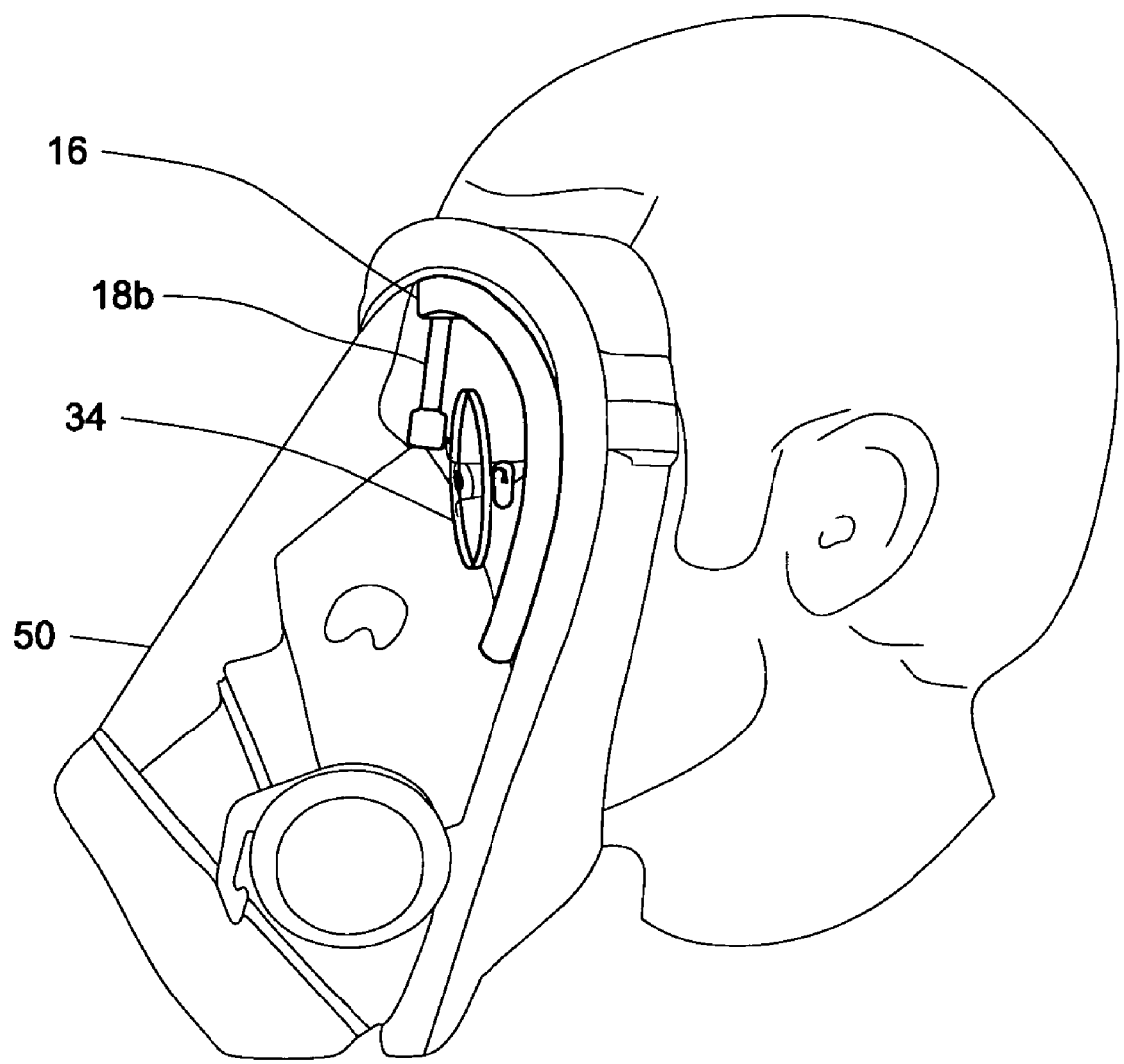
FIG. 14 shows a side perspective view of a safety mask having a spectacle frame attached to an adjustable spectacle kit.

FIG. 14 is a side view of an MSA mask 50 fitted with the MSA eyewear 34 of FIG. 11. A removable insert 16 inside the mask 50 supports an adjustable lug 18b attached to a frame of the eyewear 34.

Figure 15:
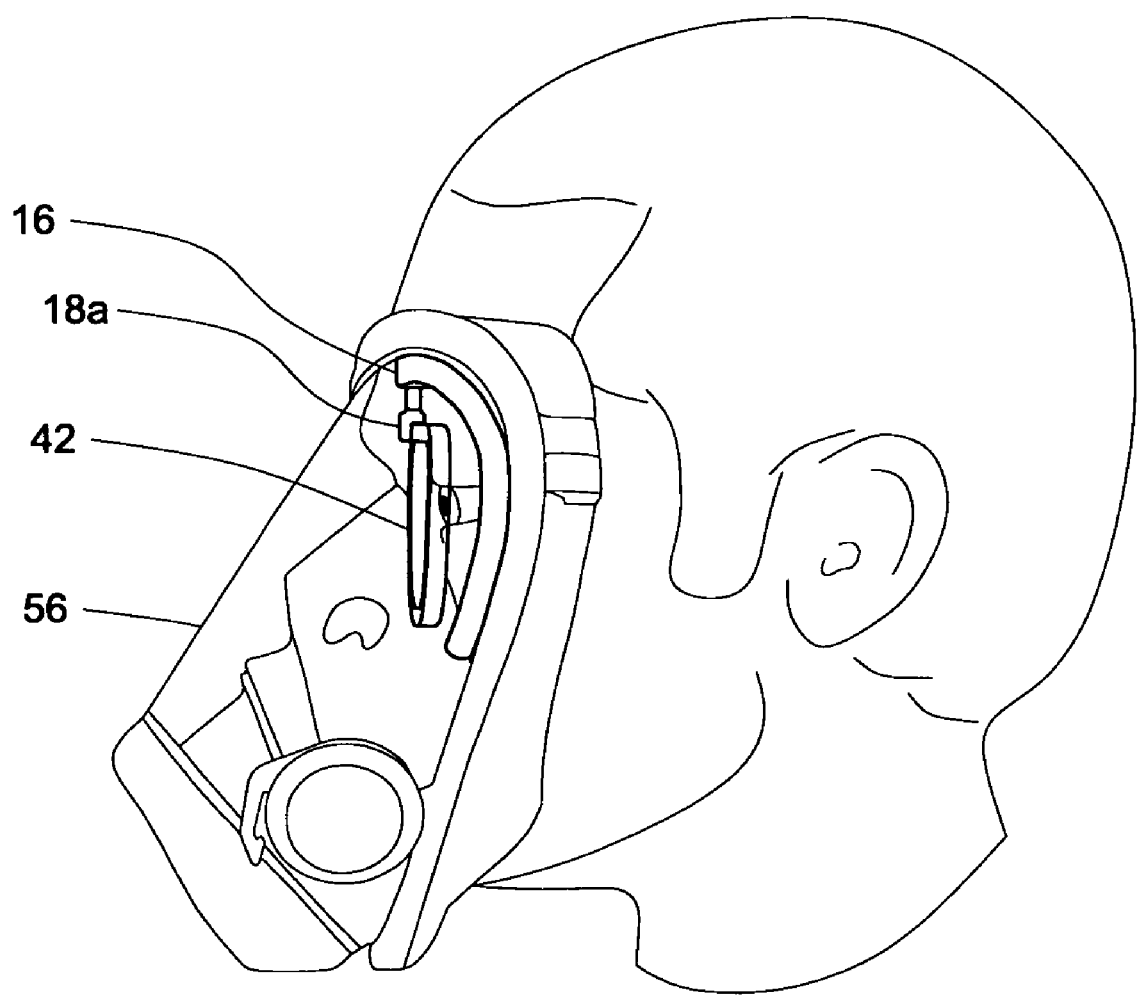
FIG. 15 shows a side perspective view of a protective mask with a frame attached to an adjustable spectacle kit.

FIG. 15 is a side view of a small SCBA 56 having a removable insert 16. The ALTEK® eyewear of FIGS. 11 and 12 includes a frame 42 attached to an adjustable lug 18a depending downwardly from the insert 16.

Figure 16:
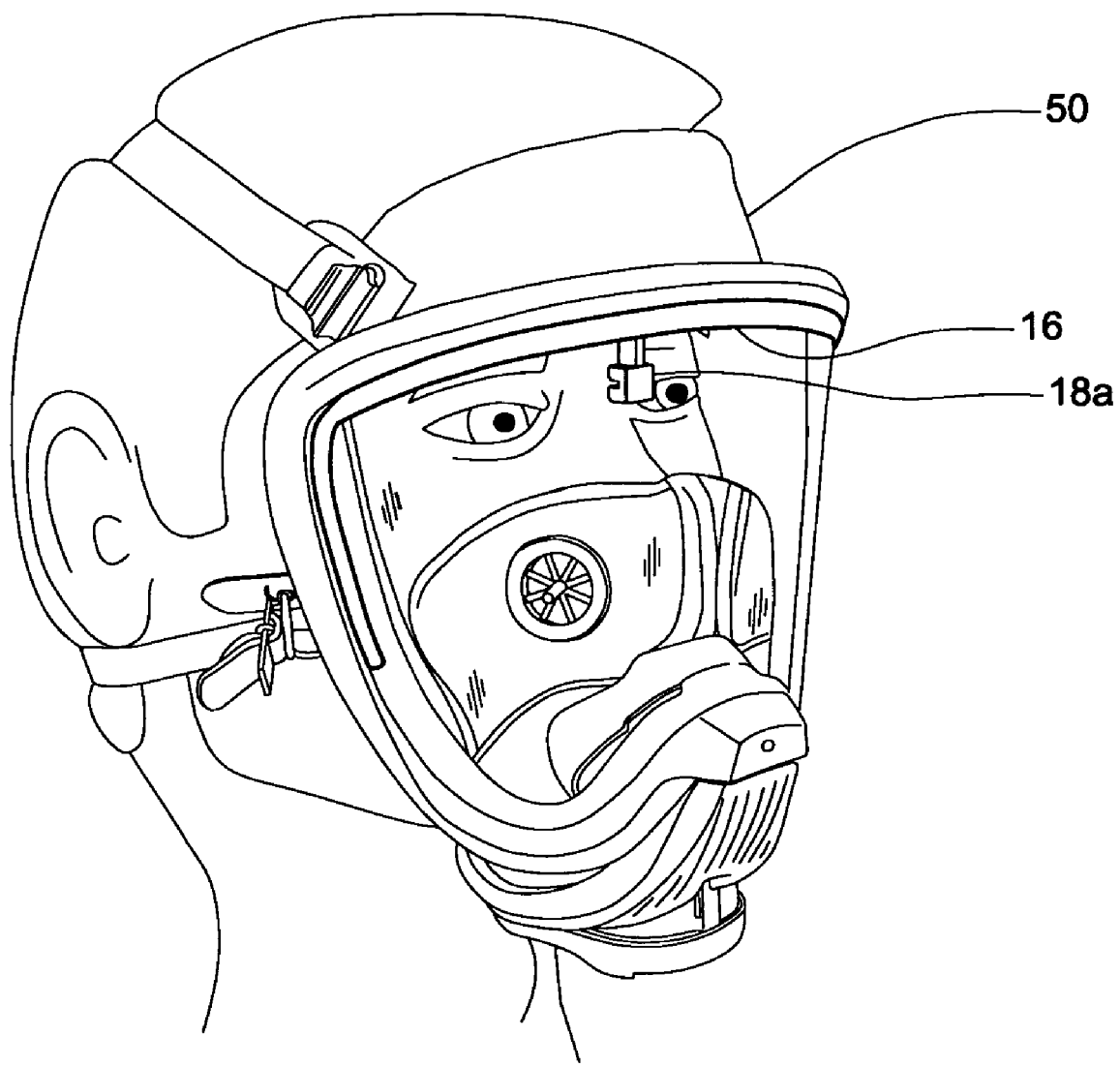
FIG. 16 shows a front perspective view of the apparatus of FIG. 1.
Figure 17:
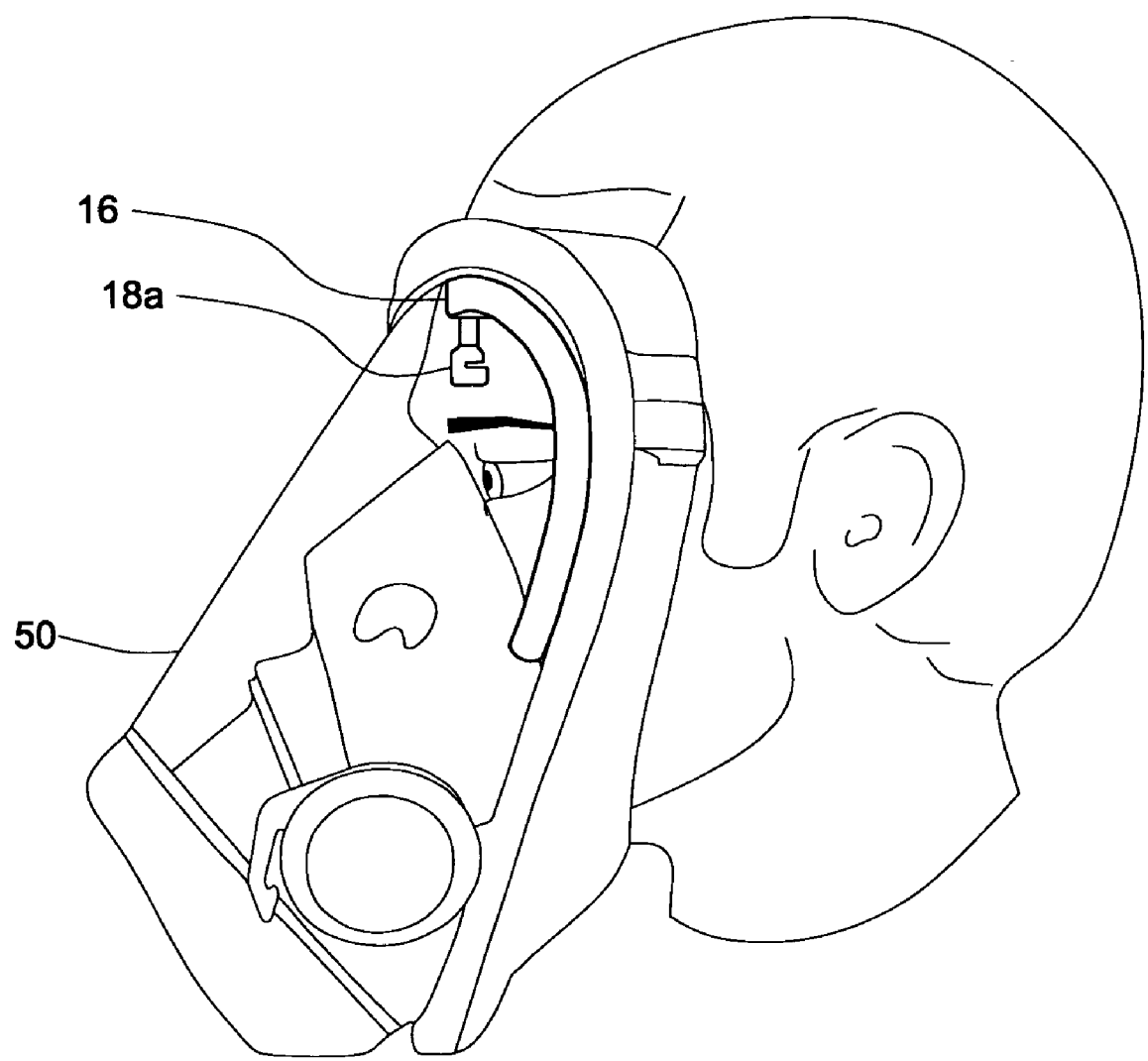
FIG. 17 shows a side perspective view of the apparatus of FIG. 2.

FIGS. 16 and 17 show masks 50 including an adjustable spectacle kit of the invention without eyewear frames installed therein. The kit of the invention does not interfere with or limit the wearer's viewing through a face plate of the mask.

Figure 18:
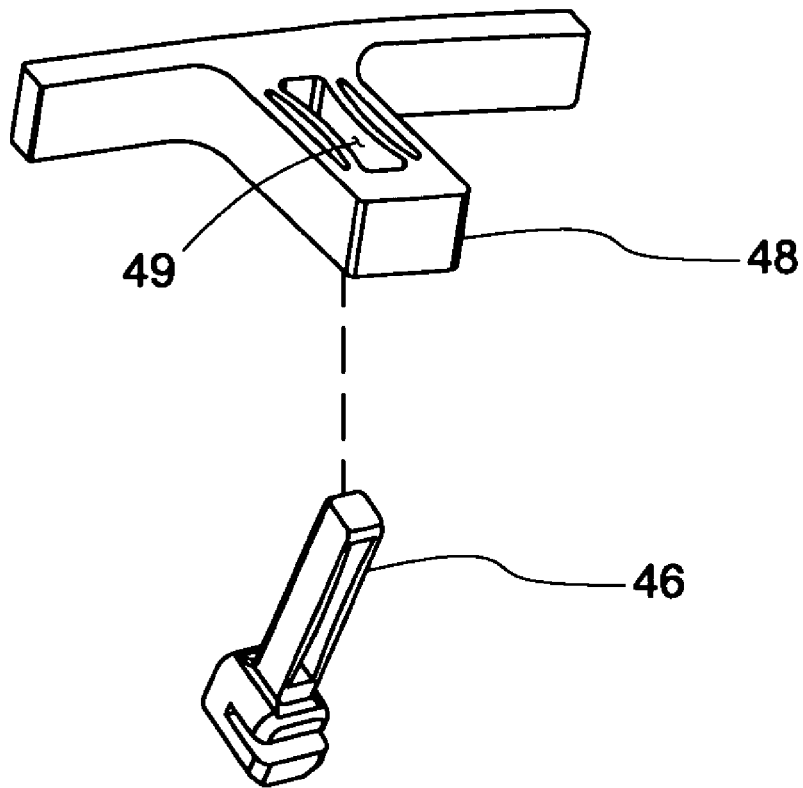
FIG. 18 shows a rear, exploded view of an adjustable spectacle kit.
Figure 19:
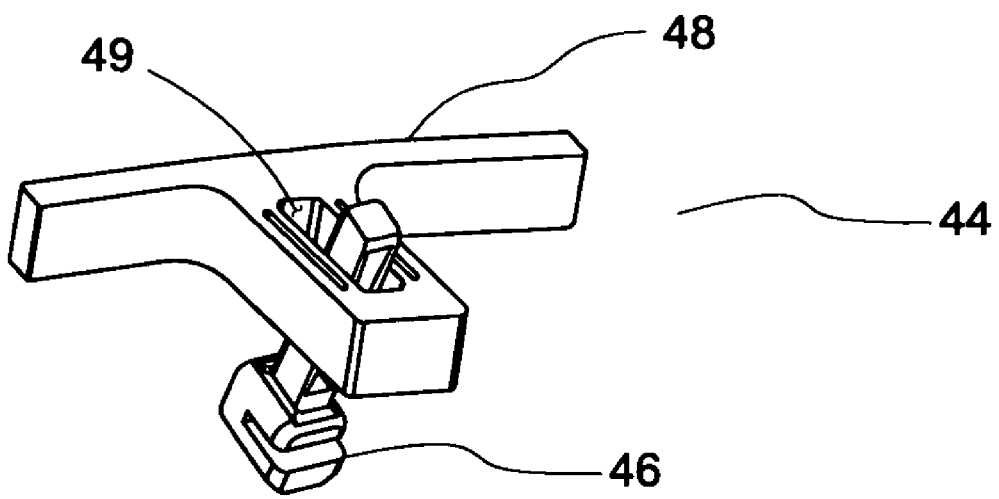
FIG. 19 shows a rear perspective view of an assembled adjustable spectacle kit.

An alternative adjustable spectacle kit 44 having differently shaped components is shown in FIGS. 18 and 19. The kit 44 includes a lug 46 and a bracket 48 to be permanently affixed to an interior surface of a mask 58 as shown in FIG. 20. Referring now to FIG. 18, the bracket 48 defines a slot 49 that is elongated in an anteroposterior direction, with both lateral walls extending convexly into the opening so that the slot has a double-concave shape. The slot 49 is wider at its anterior and posterior ends than in a central portion between those ends. Similarly the lug 46 defines a vertically elongated opening having side walls extending convexly into the opening.

Referring now to FIG. 19, when the lug 46 is inserted into the slot 49 of the bracket 48 the lateral walls of the slot 49 become parallel rather than convex and thus the opening in the lug 46 is narrowed. Both the lug 46 and bracket 48 are molded from polycarbonate having sufficient flexibility to allow movement of the lug 46 within the slot 49 while tight enough to retain an adjusted position as desired. This configuration of the slot 49 and lug 46 allows for a spring type action allowing for adjustable movement of the lug 46 similar to when the lug 46 is inserted into a grommet. The grommet is eliminated in this embodiment. The double convex sides of the slot 49 minimize frictional wear on both components so that the kit is long lasting.

Referring now to FIG. 21, there is shown another kit for adjusting the position of an eyewear frame 60. The kit includes a bracket 62 defining a slot for retaining a lug 66. A locking device or lock 64 is included to keep the lug 66 more firmly in a preselected position. The generally U-shaped lock 64 includes arms clamping onto exterior sides of the bracket 62 and a bight extending between the arms. Arms of the lock 64 resist lateral expansion of the bracket 62 thereby holding the lug 66 more firmly therein. This is accomplished by pivoting the lock 64 upward which in turn compresses the exterior sides of the bracket 62 which in turn clamps the lug 66 in place.

FIGS. 22 through 28 illustrate an adjustable spectacle kit installation in an extremely tight enclosed full face mask.

Figure 22:
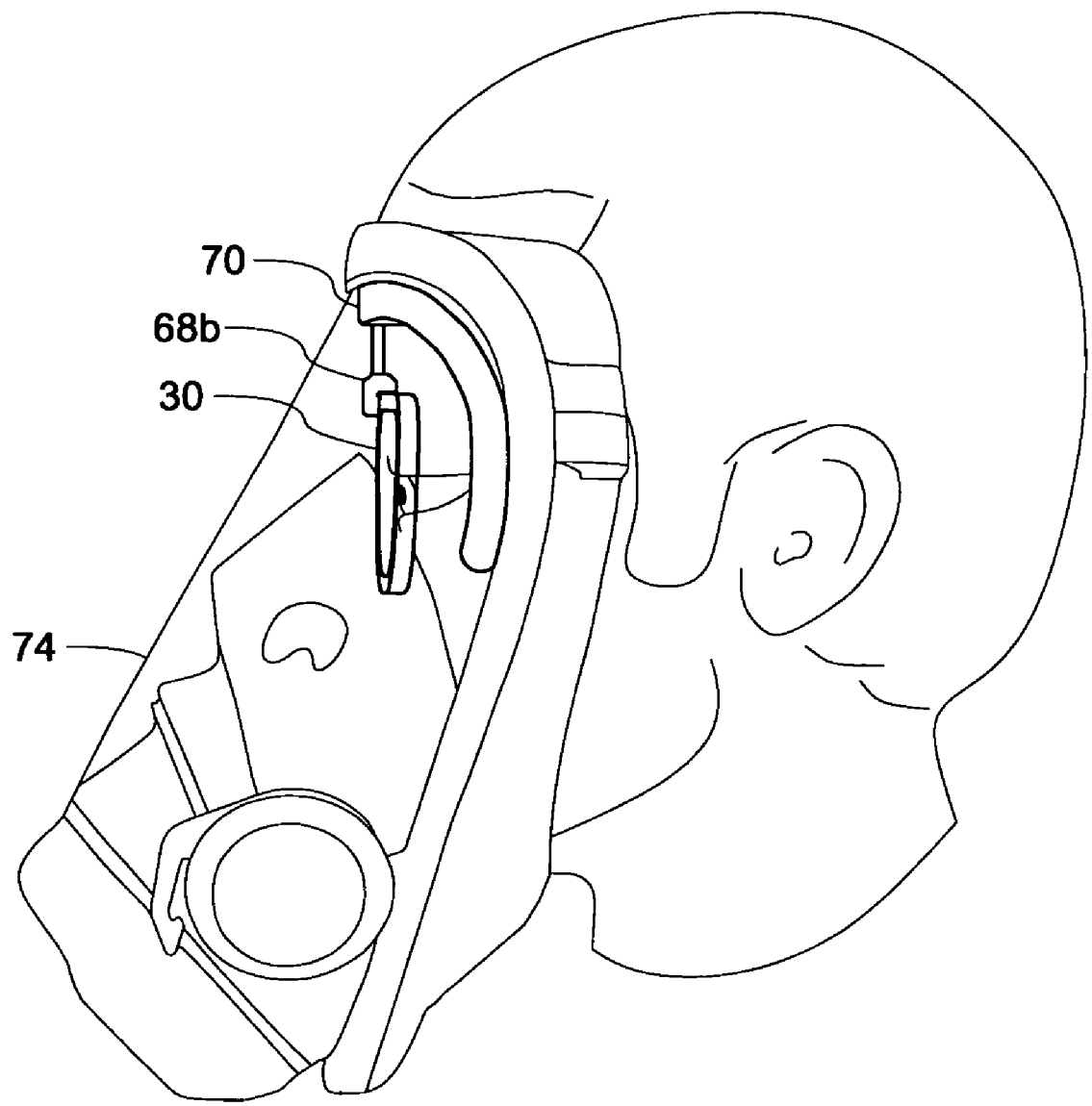
FIG. 22 shows a side perspective view of a mask which has minimum horizontal clearance, with an adjustable spectacle kit of the invention in place which permits primarily vertical and angularity adjustments.
Figure 23:
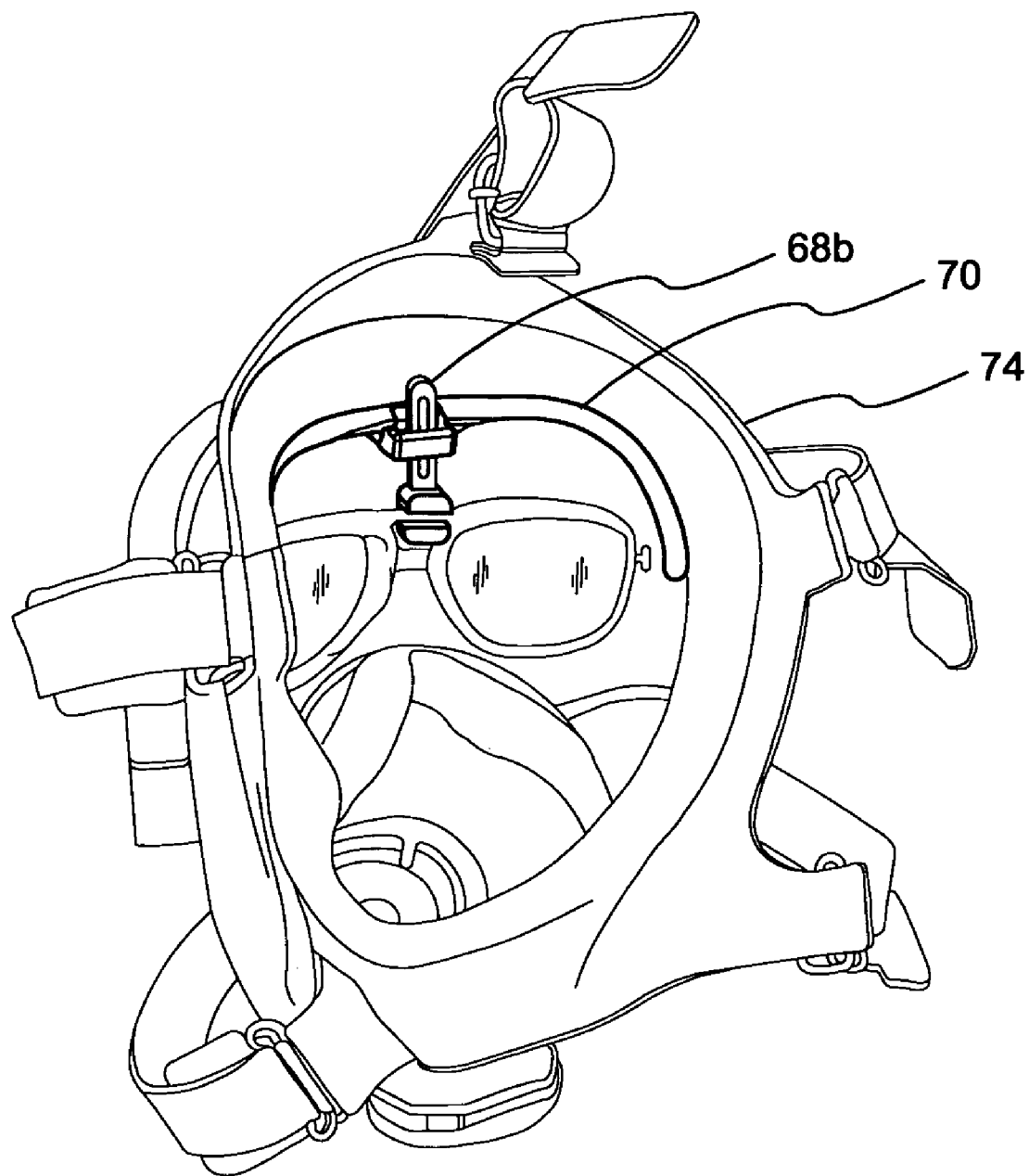
FIG. 23 shows a rear perspective view of the mask of FIG. 22
Figure 28:
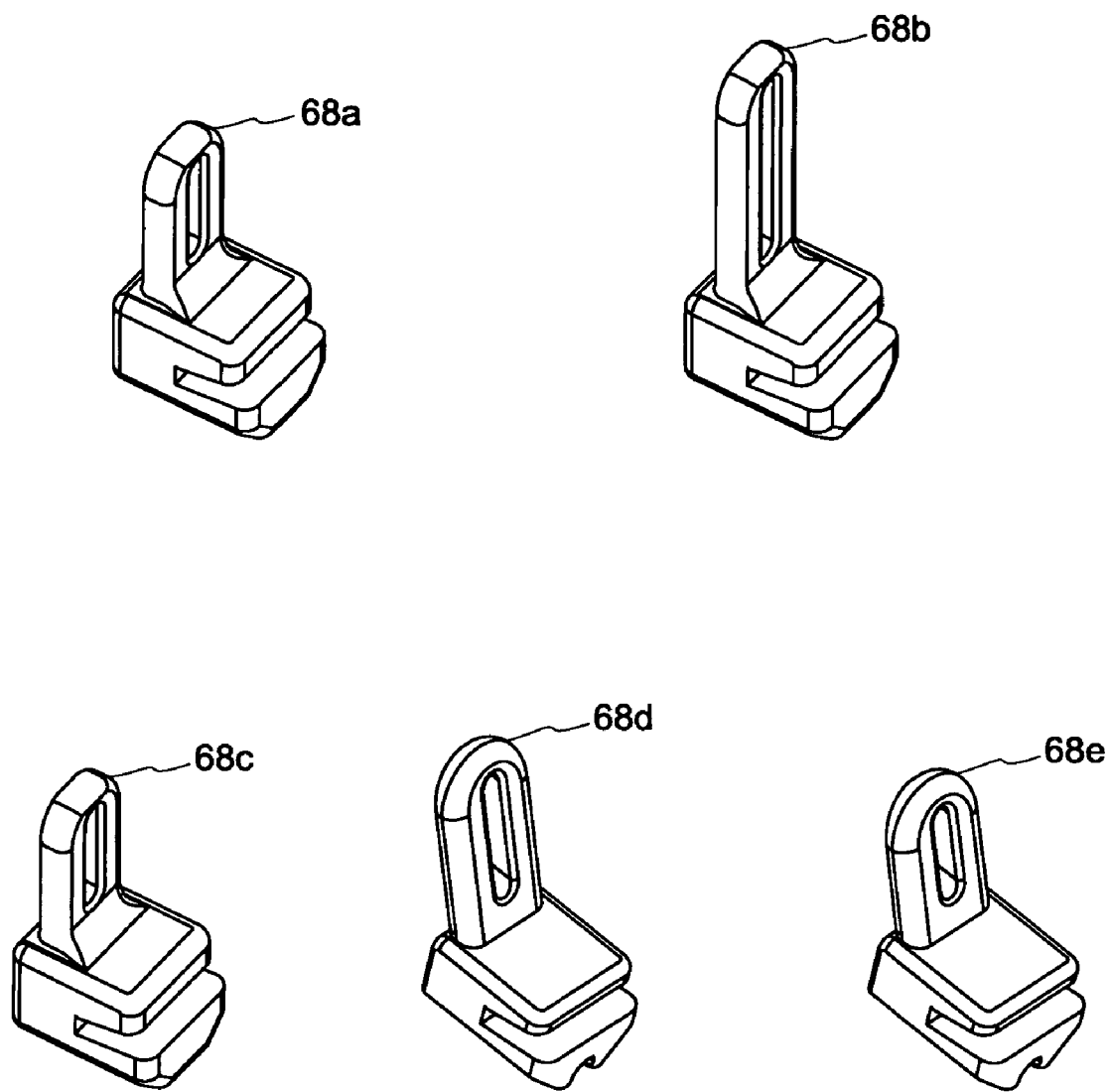
FIG. 28 shows several different embodiments of a lug for an adjustable spectacle kit.

FIGS. 22 and 23 show perspective views showing the utilization of a spectacle kit which includes adjustments vertically and angularity based on the adjustable lug as shown in FIG. 28.

Figure 24:
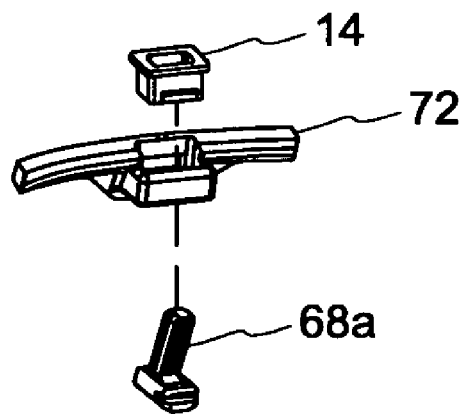
FIG. 24 shows an exploded prospective view of another adjustable spectacle kit.
Figure 25:
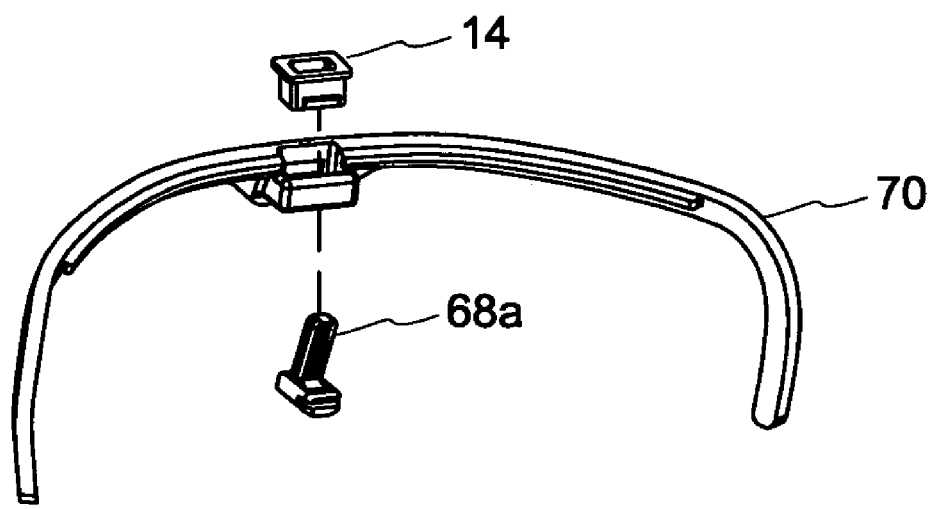
FIG. 25 shows an exploded prospective view of another adjustable spectacle kit.

FIGS. 24, 25, and 26 show detail views of an adjustable spectacle kit used in confined full face masks. This space allotment eliminates horizontally adjustment therefore requiring special adjustment lugs 68a-68e shown in FIG. 28.

Figure 27:
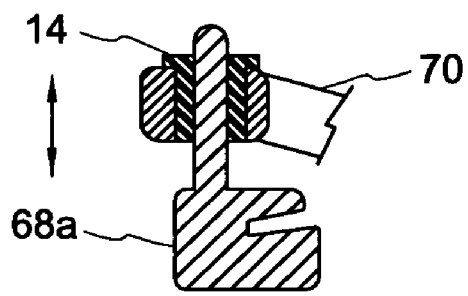
FIG. 27 shows several fragmentary cross-sectional views of an adjustable spectacle kit as sections taken from FIG. 26.
Figure 27:

FIGS. 27 and 28 depict the use of various adjustable lugs 68a through 68e giving the ultimate angularity as required. While these lugs are movable vertically, they can reflect various angles by any degree required. These lugs can be distinctively sized and shaped for quick attachment to and detachment from commercially available spectacle frames as shown in FIG. 11.

The adjustable spectacle kit of my invention may be left inside the protective masks in a fire department or an industrial safety department without impairing vision of any user. This universal aspect of the kit is desirable for organizations having many different individuals who may wear the same mask. The spectacles having lenses of a user's customized prescription may be kept in the user's possession until the next use.

My invention is described in conjunction with several preferred embodiments. Persons skilled in the art understand that changes and variations can be made in light of the foregoing detailed description. The invention embraces all such changes and variations falling within the spirit and scope of the following claims.

In the foregoing specification and in the figures of the drawings, a detailed description has been provided and set down and further includes specific embodiments of the present invention for the purpose of illustration. In respect to the figures of the drawings of the specification of the present invention, like items are identified by like numerals. As the invention has been illustrated by the preceding detailed description and in the figures of the drawings, the apparatus and method of the present invention are not intended to be construed as being limited to the specific examples of the preferred embodiments. Variations may be made to include aspects of the complete disclosure as set forth in the figures of the drawings and in the detailed description without departing from the scope of the invention as disclosed in the specification and as defined in the appended claims which follow.

The apparatus and method of the present invention are not intended to be limited to the descriptions of specific embodiments herein above, but rather the apparatus and method of the present invention should be viewed in terms of the complete specification and claims which follow and equivalents thereof.

What is claimed is:

1. A combination self contained breathing mask and adjustable spectacle kit, said combination comprising:
    (a) a self contained breathing mask for covering a full face of a wearer and including a face plate permitting the wearer to view a space outside the mask, said mask including an exterior surface and an interior surface;
    (b) an adjustable spectacle kit inside the mask, said kit comprising:
        (1) a bracket adapted to be attached to the interior surface of the mask, said bracket defining a slot for holding an adjustable lug;
        (2) an adjustable lug extending through said slot in the bracket, said lug including an upper end portion above the bracket and a lower end portion below the bracket, said lug frictionally engaging the slot, said lower end portion of the lug including a frame holder for connection with a spectacle frame;
        (3) spectacles including a frame for supporting at least one eyeglass lens and including a bridge, said frame holder connecting the frame with the lug for positionally adjusting the frame within the mask; and
        (4) a resilient grommet inserted in said slot and frictionally engaging said lug, said grommet comprising an elastomer.

2. The combination mask and adjustable spectacle kit of claim 1 further comprising:
    (5) a lock supported by the bracket for locking the lug into a position in the bracket selected by the user.

3. The combination mask and adjustable spectacle kit of claim 2 wherein said bracket includes opposite lateral sides and said lock is supported by arms attached to said lateral sides.

4. The combination mask and adjustable spectacle kit of claim 1 further comprising:
    (5) a removable insert for engaging said interior surface of the mask, said insert supporting said bracket.

5. The combination mask and adjustable spectacle kit of claim 4 wherein said bracket is formed integrally with said insert.

6. The combination mask and adjustable spectacle kit of claim 1 wherein said frame is adjustable upwardly and downwardly, anteroposteriorly, and rotationally within the mask.

7. The combination mask and adjustable spectacle kit of claim 1 wherein said slot is elongated anteroposteriorly.

8. The combination mask and adjustable spectacle kit of claim 7 wherein said slot has opposed lateral walls extending convexly into the slot, said slot having anterior and posterior ends wider than a central portion between the anterior and posterior ends.

9. The combination mask and adjustable spectacle kit of claim 1 wherein said lug defines an elongated slit having convex side walls.

10. An adjustable spectacle kit for placement inside a protective mask having a face plate permitting a wearer to look at an environment outside the mask, said kit comprising:
   (a) a bracket adapted for attachment to an interior portion of the mask, said bracket defining an elongated slot for engaging a lug;
   (b) a lug extending through said slot in the bracket, said lug including an upper end portion above the bracket and a lower end portion below the bracket, said lug frictionally engaging the slot, said lower end portion of the lug including a frame holder for connection with a spectacle frame;
   (c) spectacles including a frame supporting two eyeglass lenses and a bridge between the lenses, said frame holder connecting the frame with the lug for positionally adjusting the frame to improve the wearer's vision; and
   (d) a resilient grommet inserted in said slot and circumscribing said lug.

11. The adjustable spectacle kit of claim 10 wherein said frame holder comprises a clip sized for insertion into a receiver defined by the spectacles frame.

12. The adjustable spectacle kit of claim 10 capable of being inserted within minimum confines of a full face mask yet allowing an individual to adjust the eyeglass lenses to suit their personal requirement.

13. A protection method, comprising:
   (a) providing a self contained breathing mask for covering a full face of a wearer and including a face plate permitting the wearer to view a space outside the mask, said mask including an exterior surface and an interior surface;
   (b) providing an adjustable spectacle kit inside the mask, comprising:
      (1) attaching a bracket to the interior surface of the mask, said bracket defining a slot for holding an adjustable lug;
      (2) extending an adjustable lug through said slot in the bracket, said lug including an upper end portion above the bracket and a lower end portion below the bracket, said lug frictionally engaging the slot, said lower end portion of the lug including a frame holder for connection with a spectacle frame;
      (3) providing spectacles including a frame for supporting at least one eyeglass lens and including a bridge, said frame holder connecting the frame with the lug for positionally adjusting the frame within the mask; and
      (4) providing a resilient grommet inserted in said slot and frictionally engaging said lug, said grommet comprising an elastomer.

14. The protection method as set forth in claim 13, further comprising:
   5) providing a lock supported by the bracket for locking the lug into a position in the bracket selected by the user.

15. The protection method as set forth in claim 14, wherein said bracket includes opposite lateral sides and lock is supported by arms attached to said lateral sides.

16. The protection method as set forth in claim 13, further comprising:
   (5) providing a removable insert for engaging said interior surface of the mask, said insert supporting said bracket.

17. The protection method as set forth in claim 16, wherein said bracket is formed integrally with said insert.

\* \* \* \* \*